United States Patent
Fagundes (10) Patent No.: US 8,831,206 B1
(45) Date of Patent: Sep. 9, 2014

(54) AUTOMATED, DATA-BASED MECHANISM TO DETECT EVOLUTION OF EMPLOYEE SKILLS

(75) Inventor: Luciano Godoy Fagundes, Sao Paulo (BR)

(73) Assignee: Avaya Inc., Basking Ridge, NJ (US)

( * ) Notice: Subject to any disclaimer, the term of this patent is extended or adjusted under 35 U.S.C. 154(b) by 943 days.

(21) Appl. No.: 12/119,358

(22) Filed: May 12, 2008

(51) Int. Cl.
H04M 3/523 (2006.01)

(52) U.S. Cl.
USPC ............ 379/265.12; 379/265.02; 379/265.03; 379/265.06; 379/265.13; 379/266.02

(58) Field of Classification Search
USPC ............. 379/265.11–265.14, 266.01–266.06; 709/228
See application file for complete search history.

(56) References Cited

U.S. PATENT DOCUMENTS

| | | | |
|---|---|---|---|
| 4,163,124 A | 7/1979 | Jolissaint | |
| 4,567,323 A | 1/1986 | Lottes et al. | |
| 4,737,983 A | 4/1988 | Frauenthal et al. | |
| 4,797,911 A | 1/1989 | Szlam et al. | |
| 4,894,857 A | 1/1990 | Szlam et al. | |
| 5,001,710 A | 3/1991 | Gawrys et al. | |
| 5,097,528 A | 3/1992 | Gursahaney et al. | |
| 5,101,425 A | 3/1992 | Darland | |
| 5,155,761 A | 10/1992 | Hammond | |
| 5,164,983 A | 11/1992 | Brown et al. | |
| 5,206,903 A * | 4/1993 | Kohler et al. | 379/265.12 |
| 5,210,789 A | 5/1993 | Jeffus et al. | |
| 5,274,700 A | 12/1993 | Gechter et al. | |
| 5,278,898 A | 1/1994 | Cambray et al. | |
| 5,291,550 A | 3/1994 | Levy et al. | |
| 5,299,260 A | 3/1994 | Shaio | |
| 5,309,513 A | 5/1994 | Rose | |
| 5,335,268 A | 8/1994 | Kelly, Jr. et al. | |
| 5,335,269 A | 8/1994 | Steinlicht | |
| 5,390,243 A | 2/1995 | Casselman et al. | |
| 5,436,965 A | 7/1995 | Grossman et al. | |
| 5,444,774 A | 8/1995 | Friedes | |
| 5,469,503 A | 11/1995 | Butensky et al. | |
| 5,469,504 A | 11/1995 | Blaha | |
| 5,473,773 A | 12/1995 | Aman et al. | |
| 5,479,497 A | 12/1995 | Kovarik | |

(Continued)

FOREIGN PATENT DOCUMENTS

| | | |
|---|---|---|
| CA | 2143198 | 1/1995 |
| CA | 2174762 | 3/1996 |

(Continued)

OTHER PUBLICATIONS

Ahmed, Sarah, "A Scalable Byzantine Fault Tolerant Secure Domain Name System," thesis submitted to Massachusetts Institute of Technology, Department of Electrical Engineering and Computer Science, Jan. 22, 2001, 101 pages.

(Continued)

Primary Examiner — Joseph J Nguyen
(74) Attorney, Agent, or Firm — Sheridan Ross P.C.

(57) ABSTRACT

A contact center is provided that includes a plurality of agents for servicing incoming contacts and an evolutionary routing mechanism that is capable of dynamically testing and analyzing the performance/skills of each agent. As the evolutionary routing mechanism detects that the skills of the agent have sufficiently changed, the evolutionary routing mechanism may cause the skills of that agent to be updated, thereby altering the routing algorithm.

24 Claims, 8 Drawing Sheets

(56) References Cited

U.S. PATENT DOCUMENTS

| | | |
|---|---|---|
| 5,500,795 A | 3/1996 | Powers et al. |
| 5,504,894 A | 4/1996 | Ferguson et al. |
| 5,506,898 A | 4/1996 | Costantini et al. |
| 5,530,744 A | 6/1996 | Charalambous et al. |
| 5,537,470 A | 7/1996 | Lee |
| 5,537,542 A | 7/1996 | Eilert et al. |
| 5,544,232 A | 8/1996 | Baker et al. |
| 5,546,452 A | 8/1996 | Andrews et al. |
| 5,592,378 A | 1/1997 | Cameron et al. |
| 5,592,542 A | 1/1997 | Honda et al. |
| 5,594,726 A | 1/1997 | Thompson et al. |
| 5,606,361 A | 2/1997 | Davidsohn et al. |
| 5,611,076 A | 3/1997 | Durflinger et al. |
| 5,627,884 A | 5/1997 | Williams et al. |
| 5,642,515 A | 6/1997 | Jones et al. |
| 5,684,872 A | 11/1997 | Flockhart et al. |
| 5,684,874 A | 11/1997 | Yagyu et al. |
| 5,684,964 A | 11/1997 | Powers et al. |
| 5,689,698 A | 11/1997 | Jones et al. |
| 5,703,943 A | 12/1997 | Otto |
| 5,713,014 A | 1/1998 | Durflinger et al. |
| 5,724,092 A | 3/1998 | Davidsohn et al. |
| 5,740,238 A | 4/1998 | Flockhart et al. |
| 5,742,675 A | 4/1998 | Kilander et al. |
| 5,748,468 A | 5/1998 | Notenboom et al. |
| 5,749,079 A | 5/1998 | Yong et al. |
| 5,751,707 A | 5/1998 | Voit et al. |
| 5,752,027 A | 5/1998 | Familiar |
| 5,754,639 A | 5/1998 | Flockhart et al. |
| 5,754,776 A | 5/1998 | Hales et al. |
| 5,754,841 A | 5/1998 | Carino, Jr. |
| 5,757,904 A | 5/1998 | Anderson |
| 5,790,677 A | 8/1998 | Fox et al. |
| 5,794,250 A | 8/1998 | Carino, Jr. et al. |
| 5,796,393 A | 8/1998 | MacNaughton et al. |
| 5,802,282 A | 9/1998 | Hales et al. |
| 5,818,907 A | 10/1998 | Maloney et al. |
| 5,825,869 A | 10/1998 | Brooks et al. |
| 5,828,747 A * | 10/1998 | Fisher et al. ............. 379/265.12 |
| 5,838,968 A | 11/1998 | Culbert |
| 5,839,117 A | 11/1998 | Cameron et al. |
| 5,875,437 A | 2/1999 | Atkins |
| 5,880,720 A | 3/1999 | Iwafune et al. |
| 5,881,238 A | 3/1999 | Aman et al. |
| 5,884,032 A | 3/1999 | Bateman et al. |
| 5,889,956 A | 3/1999 | Hauser et al. |
| 5,897,622 A | 4/1999 | Blinn et al. |
| 5,903,641 A | 5/1999 | Tonisson |
| 5,903,877 A | 5/1999 | Berkowitz et al. |
| 5,905,793 A | 5/1999 | Flockhart et al. |
| 5,915,012 A | 6/1999 | Miloslavsky |
| 5,926,538 A | 7/1999 | Deryugin et al. |
| 5,930,786 A | 7/1999 | Carino, Jr. et al. |
| 5,937,051 A | 8/1999 | Hurd et al. |
| 5,937,402 A | 8/1999 | Pandit |
| 5,940,496 A | 8/1999 | Gisby et al. |
| 5,943,416 A | 8/1999 | Gisby |
| 5,948,065 A | 9/1999 | Eilert et al. |
| 5,960,073 A | 9/1999 | Kikinis et al. |
| 5,963,635 A | 10/1999 | Szlam et al. |
| 5,963,911 A | 10/1999 | Walker et al. |
| 5,970,132 A | 10/1999 | Brady |
| 5,974,135 A | 10/1999 | Breneman et al. |
| 5,974,462 A | 10/1999 | Aman et al. |
| 5,982,873 A | 11/1999 | Flockhart et al. |
| 5,987,117 A | 11/1999 | McNeil et al. |
| 5,991,392 A | 11/1999 | Miloslavsky |
| 5,996,013 A | 11/1999 | Delp et al. |
| 5,999,963 A | 12/1999 | Bruno et al. |
| 6,000,832 A | 12/1999 | Franklin et al. |
| 6,011,844 A | 1/2000 | Uppaluru et al. |
| 6,038,293 A | 3/2000 | McNerney et al. |
| 6,044,144 A | 3/2000 | Becker et al. |
| 6,044,205 A | 3/2000 | Reed et al. |
| 6,044,355 A | 3/2000 | Crockett et al. |
| 6,049,547 A | 4/2000 | Fisher et al. |
| 6,052,723 A | 4/2000 | Ginn |
| 6,055,308 A | 4/2000 | Miloslavsky et al. |
| 6,064,730 A | 5/2000 | Ginsberg |
| 6,064,731 A | 5/2000 | Flockhart et al. |
| 6,084,954 A | 7/2000 | Harless et al. |
| 6,088,441 A | 7/2000 | Flockhart et al. |
| 6,115,462 A | 9/2000 | Servi et al. |
| 6,128,380 A | 10/2000 | Shaffer et al. |
| 6,151,571 A | 11/2000 | Pertrushin |
| 6,154,769 A | 11/2000 | Cherkasova et al. |
| 6,163,607 A | 12/2000 | Bogart et al. |
| 6,173,053 B1 | 1/2001 | Bogart et al. |
| 6,175,564 B1 | 1/2001 | Miloslavsky et al. |
| 6,178,441 B1 | 1/2001 | Elnozahy |
| 6,185,292 B1 | 2/2001 | Miloslavsky |
| 6,192,122 B1 | 2/2001 | Flockhart et al. |
| 6,215,865 B1 | 4/2001 | McCalmont |
| 6,226,377 B1 | 5/2001 | Donaghue, Jr. |
| 6,229,819 B1 | 5/2001 | Darland et al. |
| 6,230,183 B1 | 5/2001 | Yocom et al. |
| 6,233,333 B1 | 5/2001 | Dezonmo |
| 6,240,417 B1 | 5/2001 | Eastwick |
| 6,259,969 B1 | 7/2001 | Tackett et al. |
| 6,263,359 B1 | 7/2001 | Fong et al. |
| 6,272,544 B1 | 8/2001 | Mullen |
| 6,275,806 B1 | 8/2001 | Pertrushin |
| 6,275,812 B1 | 8/2001 | Haq et al. |
| 6,275,991 B1 | 8/2001 | Erlin |
| 6,278,777 B1 | 8/2001 | Morley |
| 6,292,550 B1 | 9/2001 | Burritt |
| 6,295,353 B1 | 9/2001 | Flockhart et al. |
| 6,353,810 B1 | 3/2002 | Petrushin |
| 6,356,632 B1 | 3/2002 | Foster et al. |
| 6,366,668 B1 | 4/2002 | Borst et al. |
| 6,389,028 B1 | 5/2002 | Bondarenko et al. |
| 6,389,132 B1 | 5/2002 | Price |
| 6,389,400 B1 | 5/2002 | Bushey et al. |
| 6,408,066 B1 * | 6/2002 | Andruska et al. ........ 379/265.12 |
| 6,424,709 B1 | 7/2002 | Doyle et al. |
| 6,426,950 B1 | 7/2002 | Mistry |
| 6,427,137 B2 | 7/2002 | Pertrushin |
| 6,430,282 B1 | 8/2002 | Bannister et al. |
| 6,434,230 B1 | 8/2002 | Gabriel |
| 6,449,356 B1 | 9/2002 | Dezonno |
| 6,449,358 B1 | 9/2002 | Anisimov et al. |
| 6,449,646 B1 | 9/2002 | Sikora et al. |
| 6,453,038 B1 | 9/2002 | McFarlane et al. |
| 6,463,148 B1 | 10/2002 | Brady |
| 6,463,346 B1 | 10/2002 | Flockhart et al. |
| 6,463,415 B2 | 10/2002 | St. John |
| 6,480,826 B2 | 11/2002 | Pertrushin |
| 6,490,350 B2 | 12/2002 | McDuff et al. |
| 6,535,600 B1 | 3/2003 | Fisher et al. |
| 6,535,601 B1 | 3/2003 | Flockhart et al. |
| 6,560,330 B2 | 5/2003 | Gabriel |
| 6,560,649 B1 | 5/2003 | Mullen et al. |
| 6,560,707 B2 | 5/2003 | Curtis et al. |
| 6,563,920 B1 | 5/2003 | Flockhart et al. |
| 6,597,685 B2 | 7/2003 | Miloslavsky et al. |
| 6,614,903 B1 | 9/2003 | Flockhart et al. |
| 6,650,748 B1 | 11/2003 | Edwards et al. |
| 6,697,457 B2 | 2/2004 | Petrushin |
| 6,704,409 B1 | 3/2004 | Dilip et al. |
| 6,707,903 B2 | 3/2004 | Burok et al. |
| 6,754,333 B1 | 6/2004 | Flockhart et al. |
| 6,766,013 B2 | 7/2004 | Flockhart et al. |
| 6,766,014 B2 | 7/2004 | Flockhart et al. |
| 6,947,543 B2 | 9/2005 | Alvarado et al. |
| 7,035,927 B2 | 4/2006 | Flockhart et al. |
| 7,072,966 B1 * | 7/2006 | Benjamin et al. ............. 709/228 |
| 7,177,316 B1 * | 2/2007 | Pilecek ..................... 370/400 |
| 7,899,179 B2 * | 3/2011 | Kadashevich ........... 379/266.01 |
| 2002/0114432 A1 * | 8/2002 | Shaffer et al. ............ 379/90.01 |
| 2002/0194002 A1 | 12/2002 | Petrushin |
| 2003/0174830 A1 | 9/2003 | Boyer et al. |
| 2003/0177017 A1 | 9/2003 | Boyer et al. |
| 2003/0206622 A1 * | 11/2003 | Foster ..................... 379/265.09 |
| 2004/0203878 A1 | 10/2004 | Thomson |

(56) References Cited

U.S. PATENT DOCUMENTS

| | | | | |
|---|---|---|---|---|
| 2006/0233346 | A1* | 10/2006 | McIlwaine et al. | 379/265.02 |
| 2006/0245579 | A1* | 11/2006 | Bienfait et al. | 379/265.02 |
| 2007/0121800 | A1* | 5/2007 | Rodkey et al. | 379/37 |
| 2007/0133781 | A1* | 6/2007 | Febonio et al. | 379/265.05 |
| 2007/0291922 | A1* | 12/2007 | Matteo et al. | 379/265.01 |
| 2008/0002823 | A1* | 1/2008 | Fama et al. | 379/265.12 |
| 2008/0192908 | A1* | 8/2008 | O'Keefe et al. | 379/93.17 |

FOREIGN PATENT DOCUMENTS

| | | |
|---|---|---|
| EP | 0501189 | 9/1992 |
| EP | 0740450 | 10/1996 |
| EP | 0772335 | 5/1997 |
| EP | 0829996 | 3/1998 |
| EP | 0855826 | 7/1998 |
| EP | 0863651 | 9/1998 |
| EP | 0866407 | 9/1998 |
| EP | 899673 | 3/1999 |
| EP | 998108 | 5/2000 |
| EP | 1091307 | 4/2001 |
| EP | 1150236 | 10/2001 |
| GB | 2273418 | 6/1994 |
| GB | 2290192 | 12/1995 |
| WO | WO 96/07141 | 3/1996 |
| WO | WO 97/28635 | 8/1997 |
| WO | WO 98/56207 | 12/1998 |

OTHER PUBLICATIONS

Avaya, Inc. Business Advocate Options, at http://www.avaya.com, downloaded on Feb. 15, 2003, Avaya, Inc. 2003.
Avaya, Inc. Business Advocate Product Summary, at http://www.avaya.com, downloaded on Feb. 15, 2003, Avaya, Inc. 2003, 3 pages.
Avaya, Inc. CentreVu Advocate, Release 9, User Guide, Dec. 2000.
Avaya, Inc., "Better Implementation of IP in Large Networks," Avaya, Inc. 2002, 14 pages.
Avaya, Inc., "The Advantages of Load Balancing in the Multi-Call Center Enterprise," Avaya, Inc., 2002, 14 pages.
Avaya, Inc., "Voice Over IP Via Virtual Private Networks: An Overview," Avaya, Inc., Feb. 2001, 9 pages.
Bellsouth Corp., "Frequently Asked Questions—What is a registrar?," available at https://registration.bellsouth.net/NASApp/DNSWebUI/FAQ.jsp, downloaded Mar. 31, 2003, 4 pages.
Chavez, David, et al., "Avaya MultiVantage Software: Adapting Proven Call Processing for the Transition to Converged IP Networks," Avaya, Inc., Aug. 2002.
Coles, Scott, "A Guide for Ensuring Service Quality in IP Voice Networks," Avaya, Inc., 2002, pp. 1-17.
Dawson, "NPRI's Powerguide, Software Overview" Call Center Magazine (Jun. 1993), p. 85.
Doo-Hyun Kim et al. "Collaborative Multimedia Middleware Architecture and Advanced Internet Call Center," Proceedings at the International Conference on Information Networking (Jan. 31, 2001), pp. 246-250.
E. Noth et al., "Research Issues for the Next Generation Spoken": University of Erlangen-Nuremberg, Bavarian Research Centre for Knowledge-Based Systems, at http://www5.informatik.uni-erlangen.de/literature/psdir/1999/Noeth99:RIF.ps.gz, printed Feb. 10, 2003; 8 pages.
Foster, Robin, et al., "Avaya Business Advocate and its Relationship to Multi-Site Load Balancing Applications," Avaya, Inc., Mar. 2002, 14 pages.
Geotel Communications Corporation Web site printout entitled "Intelligent CallRouter Optimizing the Interaction Between Customers and Answering Resources.", 1998, 6 pages.
John H.L. Hansen and Levent M. Arsian, Foreign Accent Classification Using Source Generator Based Prosodic Features, IEEE Proc. ICASSP, vol. 1, pp. 836-839, Detroit USA (May 1995).
L.F. Laurel and J.L. Gauvain, Language Identification Using Phone-Based Acoustic Likelihood, ICASSP-94, date unknown; 4 pages.
Levent M. Arsian and John H.L. Hansen, Language Accent Classification in American English, Robust Speech Processing Laboratory, Duke University Department of Electrical Engineering, Durham, NC, Technical Report RSPL-96-7, revised Jan. 29, 1996. pp. 1-16.
Levent M. Arsian, Foreign Accent Classification in American English, Department of Electrical Computer Engineering, Duke University, Thesis, pp. 1-200 (1996).
MIT Project Oxygen, Pervasive, Human-Centered Computing (MIT Laboratory for Computer Science) (Jun. 2000) pp. 1-15.
Presentation by Victor Zue, The MIT Oxygen Project, MIT Laboratory for Computer Science (Apr. 25-26, 2000) 9 pages.
Stevenson et al.; "Name Resolution in Network and Systems Management Environments"; http://netman.cit.buffalo.edu/Doc/DStevenson/NR-NMSE.html; printed Mar. 31, 2003; 16 pages.
"Applications, NPRI's Predictive Dialing Package," Computer Technology (Fall 1993), p. 86.
"Call Center Software You Can't Outgrow," Telemarketing® (Jul. 1993), p. 105.
"Domain Name Services," available at http://www.pism.com/chapt09/chapt09.html, downloaded Mar. 31, 2003, 21 pages.
"eGain's Commerce 2000 Platform Sets New Standard for eCommerce Customer Communications," Business Wire (Nov. 15, 1999)., 3 pages.
"Internet Protocol Addressing," available at http://samspade.org/d/ipdns.html, downloaded Mar. 31, 2003, 9 pages.
"Product Features," Guide to Call Center Automation, Brock Control Systems, Inc., Activity Managers Series™, Section 5—Company B120, p. 59, 1992.
"Product Features," Guide to Call Center Automation, CRC Information Systems, Inc., Tel-ATHENA, Section 5—Company C520, p. 95, 1992.
"VAST™, Voicelink Application Software for Teleservicing®," System Manager User's Guide, Digital Systems (1994), pp. ii, vii-ix, 1-2, 2-41 through 2-77.
"When Talk Isn't Cheap," Sm@rt Reseller, v. 3, n. 13 (Apr. 3, 2000), p. 50.
Definity Communications System Generic 3 Call Vectoring/Expert Agent Selection (EAS) Guide, AT&T publication No. 555-230-520 (Issue 4, Sep. 1995).
Background of the above-captioned application (previously provided).
"Avaya IP Telephony Implementation Guide," Communication Manager 3.0, Avaya Labs, 2005, 78 pages.
TMCnet: On the Web, Jan. 26, 2008, available at https://web.archive.org/web/20080126235650//http:/www.tmcnet.com/, 2 pages.
Workforce Management: information on employment law, human resource development, Oct. 26, 2008, available at https://web.archive.org/web/20071026100342/http://workforce.com/, 3 pages.

* cited by examiner

AUTOMATED, DATA-BASED MECHANISM TO DETECT EVOLUTION OF EMPLOYEE SKILLS

FIELD

The present invention is directed generally to contact center administration and specifically to improving contact center routing.

BACKGROUND

Contact centers are employed by many enterprises to service customer contacts. A typical contact center includes a switch and/or server to receive and route incoming packet-switched and/or circuit-switched contacts and one or more resources, such as human agents and automated resources (e.g., Interactive Voice Response (IVR) units), to service the incoming contacts. Contact centers distribute contacts, whether inbound or outbound, for servicing to any suitable resource according to predefined criteria. In many existing systems, the criteria for servicing the contact from the moment that the contact center becomes aware of the contact until the contact is connected to an agent are customer-specifiable (i.e., programmable by the operator of the contact center), via a capability called vectoring. Normally in a present-day automatic call distributor (ACD), when the ACD system's controller detects that an agent has become available to handle a contact, the controller identifies all predefined contact-handling queues for the agent (usually in some order of priority) and delivers to the agent the highest-priority oldest contact that matches the agent's highest-priority queue. Generally, the only condition that results in a contact not being delivered to an available agent is that there are no contacts waiting to be handled. This type of contact distribution is generally known as skill-based routing.

One of the major costs of a contact center is associated to its human resources. Even with the fact that the involved technology is very often expensive, it is usually part of a business plan which recovers the initial investment over time. Other than the regular maintenance cost, employee costs are still the major recurring component of the general contact center cost. It is thus very important to assure that each resource/skill is fully applied to the benefit of the enterprise goals.

Several different algorithms have been deployed in order to make sure that customers are serviced by the agent who can best attend their needs. A common approach, as noted above, is called skill-based routing. This method collects data about the calling customer via IVRs or any other method and uses that extra information to establish what skills are required to properly handle a given contact. Ideally, there are going to be agents available with that same set of skills that match the contact skill requirements. The successful match between the contact required skills and the agent skills is what will lead the customer to a pleasant contact center experience.

Contact centers equipped with skill-based routing components are usually efficient at distributing contacts, but are ill equipped to help supervisors determine if an agent is ready to be transitioned from a backup role to a primary role for a particular skill or vice-versa. This problem is magnified by the fact that most contact center supervisors are required to supervise a large number of agents. Thus, most supervisors are not able to devote the amount of time required to individually analyze the development of each agent.

SUMMARY

These and other needs are addressed by the various embodiments and configurations of the present invention. The present invention is directed generally to an evolutionary routing method and systems for supporting the same. In accordance with at least some embodiments of the present invention, a communication method is provided that comprises:

receiving a contact at a contact center; and applying an evolutionary routing algorithm to assign a first resource in the contact center to the contact.

Evolutionary computing and evolutionary routing algorithms attempt to understand the biological evolutionary models, extracted from the interaction of individuals inside different biological species, and applies those concepts to enhance/optimize man made systems. Several papers provide definitions on this area. For a contact center specific case, the principles of Natural Selection are applied to the contact center environment in order to identify the most successful individuals and take advantage of such information while enhancing the contact routing strategies and the contact center in general.

A few components can be selected in order to bring the Natural Selection models into the contact center environment. The chosen ones include, but are not limited to: Species, Competition, Evolution Cycles and their Natural Disasters, Survivors (Heroes) and Deaths (Anomalies).

The Species can be mapped to individual teams or the entire contact center. It urges to find the fittest agents in order to survive. The survival of the contact center species would be dependent on external factors such as the customer satisfaction and its cost to the organization. Finding the fittest individuals would allow supervisors to create role models and make sure that most of the agents work as close as possible to those standards. Finding the most capable individuals (Heroes) is just as important as finding Anomalies. The removal of Anomalies is just as important because if it is untreated, it could spread weaknesses into the Species.

As a Species, it is important to take under consideration the internal interactions among individuals. Assuming that agents can be friends with each other and that they can talk to friends of their friends, that is how good or bad behaviors spread. It is crucial to create a healthy environment and make sure that role models are reverenced and anomalies are removed. This approach would lead to the evolution of the Species by evolving it into a stronger team. Providing tools that allow contact centers to evolve in this direction is a goal of the evolutionary routing mechanism of the present invention.

A contact center is not a simulated environment where anyone could play God and see his/her species evolving. The competition for Natural Selection takes place during the work hours. The daily service delivered to the enterprise customers is the battlefield where Heroes will be born and worst prepared soldiers will fall. These continuous battles will be limited inside Evolutionary Cycles. This would be another arbitrary measure of the system; it is the period of evaluation of the Species. Short-term campaigns such as Promotional Telemarketing could have its Evolutionary Cycles configured for a few hours; long-term campaigns such as Customer Assistance Services could have their cycle set for weeks or months.

From the computational perspective, Heroes will be the agents which are identified as the longest successful survivors on their current roles (skill sets). The successful part needs to be highlighted because a high survival rate alone is not enough to define a Hero. It could also indicate an Anomaly. Other criteria such as agent behavior or the outcome of the handled contacts may be required in order to find a proper classification.

The ideal contact center would be composed only by Heroes. That would be the stop criteria for the evolution. Since the criteria for a Hero is arbitrary and highly dependent of the Enterprise needs, the dynamic nature of the business will always challenge the contact center structure creating different needs and different kinds of Heroes over time. The evolutionary routing mechanism intends facing this challenge and providing tools which will allow the continuous evolutions of the contact center according to the enterprise dynamics. A couple examples on how Heroes could be so different depending on where in the business they belong are outlined in the following:

Collections—An outbound campaign for collecting past due bills brings immediate profit to the enterprise. Those past bills were considered as damage to the company results at some point and if they get collected, they become immediate profit. A Hero agent could be the agent that collects more money on the shortest time. Customer satisfaction could be a minor concern in this case.

Tech Support Contacts—This is typically an inbound service. A customer needs assistance with product feature or it has problems that need to be solved. On this scenario, the Hero would be the one which can provide the best assistance for each customer on the shortest time. However, the customer satisfaction rate would be a lot more important than the number of customers assisted per hour.

These are two different battlefields with two different types of Heroes. The enterprise is free to set what Hero it needs based on its own business model.

Just as important, the Anomalies could be seen as agents that not only provide poor service but they remain unnoticed doing it for several Evolutionary Cycles. Anomalies can damage the entire Species, preventing the contact center from achieving the desired results. They have been able to identify weaknesses in their environment and use them for their own benefit. It could get even worse if they pass on their knowledge and induce other agents to follow the same behavior. Depending on the case, an Anomaly could be assigned for recycling or even cut from the workforce.

Fortunately, current technology already offers some mechanisms for finding Anomalies before they cause too much damage. Business Intelligence tools allow supervisors to describe bad behavior and keep track of the agent activities. Here are a couple samples of Agent misbehaviors:

Supposing that a Contact Distributor routes contacts to least occupied agents and that an agent occupation is counted by the number of seconds that the agent's phone is kept off-hook, an agent could influence the contact routing mechanism by keeping its phone off-hook for several seconds during the day even without any contact on it. This behavior would induce the Contact Distributor to send fewer contacts to that agent. This agent would reach a long survivor time but without enough contact handling experience; that would be a good indication of a rising Anomaly.

Supposing that Agents are allowed to transfer calls to their team-mates, a miss intentioned agent could transfer most of his/her contacts back to the Contact Distributor engine in an attempt to avoid new contacts. This is another good indicator of an Anomaly.

These two scenarios show how anomaly can silently rise. If the Anomaly remains unnoticed, one agent tells another agent how to avoid new contacts and, in no time, the entire species starts suffering with bad customer service and poor Contact Center results.

The last item on this introduction is the Evolutionary Cycles and their Natural Disasters. In the contact center context, the Evolutionary Cycle is represented by a period of time where Natural Disasters are randomly or arbitrarily inserted into the system in order to find new talents/mutations and make the species stronger. Up to this point, finding Heroes and Anomalies would be just a different data-mining approach on the top of the current contact center data. The insertion of Evolution Cycles and Natural Disasters into the system is one aspect of the Evolutionary Routing mechanism.

Natural Disasters have a set of intensity levels and could go from green or safe to red or unsafe as explained later and it just means how aggressive the evolution must happen. Faster evolution could cause more programs with traditional contact center performance counters since more contacts would be connected to lower skilled agents. However, new talents could be found faster. Less aggressive evolution would emphasize the contact center performance parameters and find new talents in a slower pace.

During a Natural Disasters cycle, a customer contact whose personality has been previously identified by its history is routed to an agent which is not the best qualified resource for its assistance. The agent potential will be tested in order to evaluate his/her evolutionary state. At the end, the customer will be invited to provide his feedback about the agent and the entire information about the contact will be recorded for comparison with the Heroes/Anomalies behaviors. Based on the outcome of such comparison, the agent will be nominated for promotion of skills or for recycling. This will assure that good agents get recognized and Anomalies get eliminated.

This special routing structure will supply a new set of reports where the current level of evolution for each agent will be detailed. Suggestions for improvement could be added to the reports in order to reinforce the Hero behaviors and prevent the Anomaly ones.

Here are a few possibilities of unusual contact routing strategies that would be used during Evolutionary Cycles as Natural Disasters:

Evolutionary Routing could send a high demanding customer to a supposed Hero in order to find out if the outcome of the call indicates that the agent is really a Hero or just an anomaly.

A moderated customer could be sent to a lower skilled agent in order to verify the agent behavior in order to assess his new evolutionary state.

An easy customer could be sent to an Anomaly agent in order to confirm the Anomaly behavior.

Traditionally, the assignment of skills to agents has been the main variable for routing decisions. This new approach brings to the table another set of qualifiers that can be used to reflect the enterprise dynamics into the contact routing. One expectation is that the additional evolutionary state factor brings more distinction among the several agents and provides a better contact routing strategy.

As can be appreciated by one of skill in the art, a contact is understood herein to include but is not limited to voice calls, emails, chat, video calls, fax, voicemail messages and combinations thereof. Accordingly, a contact center may be equipped to handle any one or a number of the above-noted contact types.

These and other advantages will be apparent from the disclosure of the method(s) and apparatus(es) contained herein. The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

DETAILED DESCRIPTION

The invention will be illustrated below in conjunction with an exemplary communication system. Although well suited for use with, e.g., a system having an ACD or other similar contact-processing switch, the invention is not limited to any particular type of communication system switch or configuration of system elements. Those skilled in the art will recognize that the disclosed techniques may be used in any communication application in which it is desirable to provide improved contact processing and other similar functions.

The exemplary systems and methods of this invention will also be described in relation to analysis software, modules, and associated analysis hardware. However, to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Figure 1:
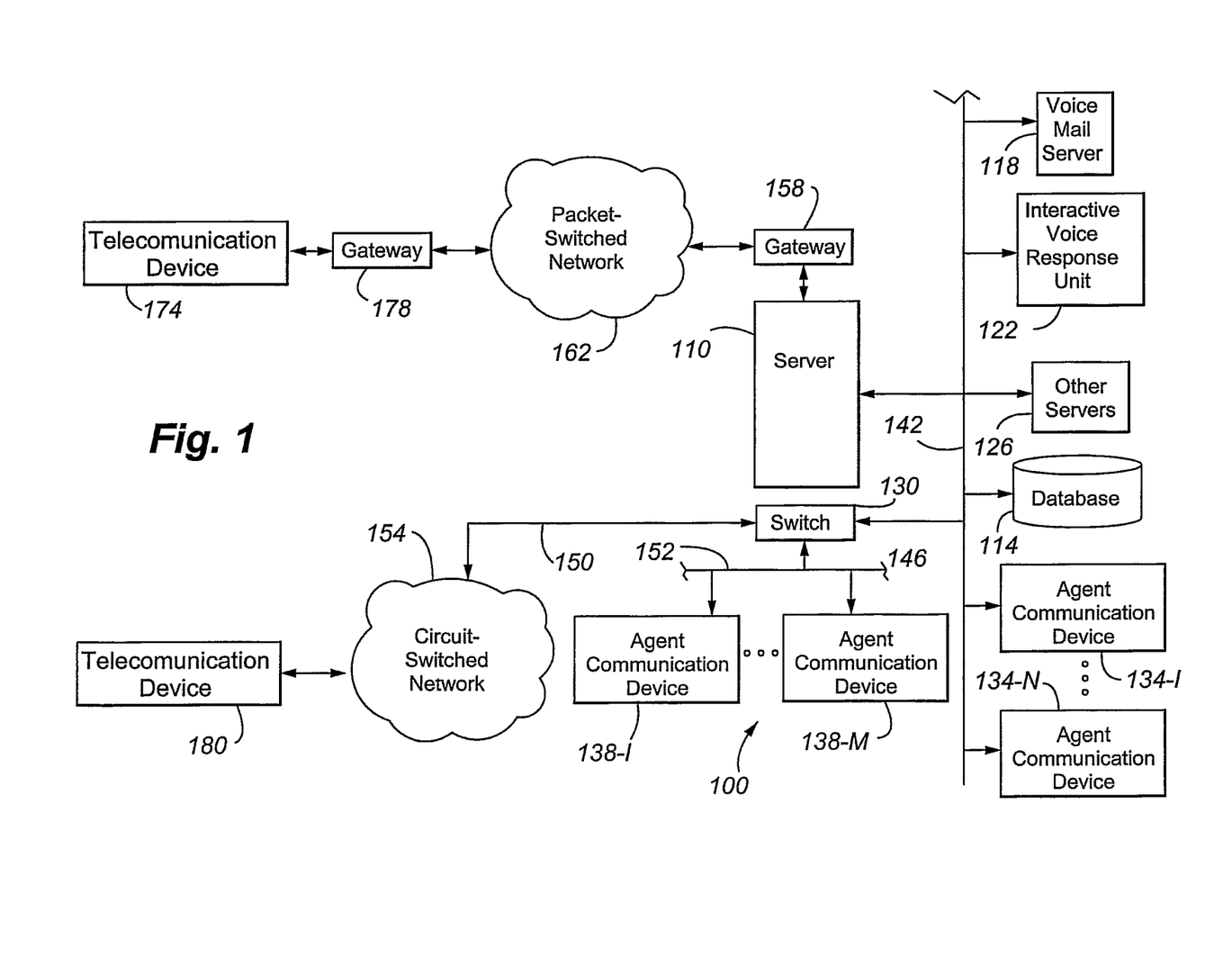
FIG. 1 is a block diagram depicting a contact center according to at least some embodiments of the present invention.

FIG. 1 shows an illustrative embodiment of the present invention. A contact center 100 comprises a central server 110, a set of data stores or databases 114 containing contact or customer related information and other information that can enhance the value and efficiency of the contact processing, and a plurality of servers, namely a voice mail server 118, an Interactive Voice Response unit or IVR 122, and other servers 126, a switch 130, a plurality of working agents operating packet-switched (first) communication devices 134-1 to N (such as computer work stations or personal computers), and/or circuit-switched (second) communication devices 138-1 to M, all interconnected by a local area network LAN (or wide area network WAN, which may include remote agents connected to the LAN via a long-distance connection between LANs) 142. The servers can be connected via optional communication lines 146 to the switch 130. As will be appreciated, the other servers 126 can also include a scanner (which is normally not connected to the switch 130 or Web server), VoIP software, video call software, voice messaging software, an IP voice server, a fax server, a web server, an email server, and the like. The switch 130 is connected via a plurality of trunks 150 to the Public Switch Telephone Network or PSTN 154 and via link(s) 152 to the second communication devices 138-1 to M. A gateway 158 is positioned between the server 110 and the packet-switched network 162 to process communications passing between the server 110 and the network 162.

The term "switch" or "server" as used herein should be understood to include a PBX, an ACD, an enterprise switch, or other type of communications system switch or server, as well as other types of processor-based communication control devices such as media servers, computers, adjuncts, etc.

Figure 2:
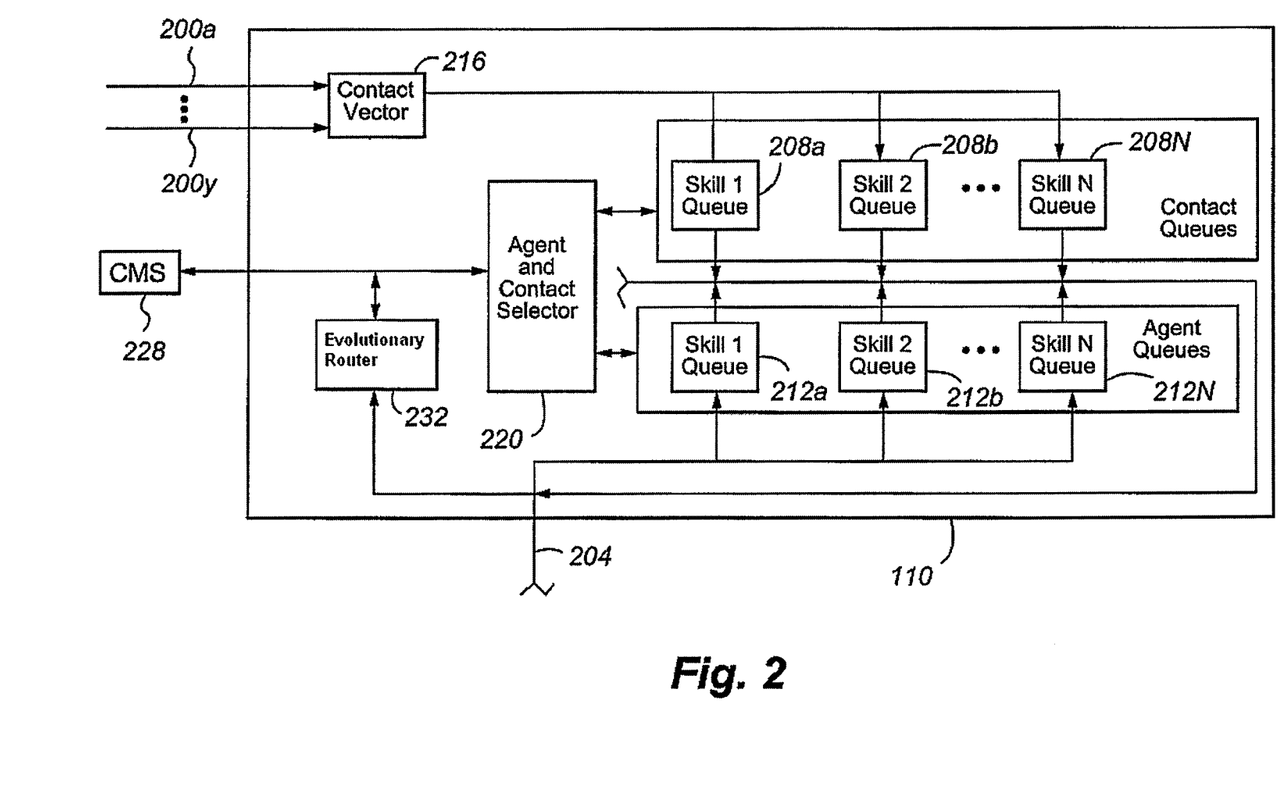
FIG. 2 is a block diagram of a server or similar contact routing device according to at least some embodiments of the present invention.

Referring to FIG. 2, one possible configuration of the server 110 is depicted. The server 110 is in communication with a plurality of customer communication lines 200a-y (which can be one or more trunks, phone lines, etc.) and agent communication line 204 (which can be a voice-and-data transmission line such as LAN 142 and/or a circuit switched voice line 140). The server 110 can include a Call Management System™ or CMS 228 that gathers call records and contact-center statistics for use in generating contact-center reports. CMS 228 and any other reporting system, such as a Basic Call Management System™, Operational Analyst™, Customer Call Routing or CCR™, or Interaction Center™ will hereinafter be referred to jointly as CMS 228.

The switch 130 and/or server 110 can be any architecture for directing contacts to one or more communication devices. In some embodiments, the switch 130 may perform load-balancing functions by allocating incoming or outgoing contacts among a plurality of logically and/or geographically distinct contact centers. Illustratively, the switch and/or server can be a modified form of the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Definity™ Private-Branch Exchange (PBX)-based ACD system; MultiVantage™ PBX, CRM Central 2000 Server™, Communication Manager™, S8300™ media server, SIP Enabled Services™, and/or Avaya Interaction Center™. Typically, the switch/server is a stored-program-controlled system that conventionally includes interfaces to external communication links, a communications switching fabric, service circuits (e.g., tone generators, announcement circuits, etc.), memory for storing control programs and data, a processor (i.e., a computer) for executing the stored control programs to control the interfaces and the fabric, and to provide automatic contact-distribution functionality. The switch and/or server typically include a network interface card (not shown) to provide services to the serviced communication devices. Other types of known switches and servers are well known in the art and therefore not described in detail herein.

As can be seen in FIG. 2, included among the data stored in the server 110 is a set of contact queues 208a-n and a separate set of agent queues 212a-n. Each contact queue 208a-n corresponds to a different set of agent queues, as each agent queue 212a-n corresponds to a different set of contact queues 208a-n. Conventionally, contacts are prioritized and either are enqueued in individual ones of the contact queues 208a-n in their order of priority or are enqueued in different ones of a plurality of contact queues that correspond to a different priority. Likewise, each of the agent's queues are prioritized according to an agent's level of expertise, in that queue. Agents can be enqueued in individual ones of agent queues 212a-n in their order of expertise level or can be enqueued in different ones of a plurality of agent queues 212a-n that correspond to a queue and each one of which corresponds to a different expertise level. Included among the control programs in the server 110 is a contact vector 216. Contacts incoming to the contact center are assigned by contact vector 216 to different contact queues 208a-n based upon a number of predetermined criteria, including customer identity, customer needs, contact center needs, current contact center queue lengths, customer value, and the agent skill that is required for the proper handling of the contact. Agents who are available for handling contacts are assigned to agent queues 212a-n based upon the skills that they possess. An agent may have multiple skills, and hence may be assigned to multiple agent queues 212a-n simultaneously. Furthermore, an agent may have different levels of skill expertise (e.g., skill levels 1-N in one configuration or merely primary skill levels and secondary skill levels in another configuration), and hence may be assigned to different agent queues 212a-n at different expertise levels. Call vectoring is described in DEFINITY Communications System Generic 3 Call Vectoring/Expert Agent Selection (EAS) Guide, AT&T publication no. 555-230-520 (Issue 3, November 1993). Skills-based ACD is described in further detail in U.S. Pat. Nos. 6,173,053 and 5,206,903.

Referring to FIG. 1, the gateway 158 can be Avaya Inc.'s, G700 Media Gateway™ and may be implemented as hardware such as via an adjunct processor (as shown) or as a chip or collection of chips in the server.

The first communication devices 134-1, . . . 134-N are packet-switched and can include, for example, IP hardphones such as the Avaya Inc.'s, 4600 Series IP Phones™, IP softphones such as Avaya Inc.'s, IP Softphone™, packet-based wireless phones, Personal Digital Assistants or PDAs, Personal Computers or PCs, laptops, packet-based H.320 video phones and conferencing units, packet-based voice messaging and response units, packet-based traditional computer telephony adjuncts, peer-to-peer based communication devices, and any other communication device.

The second communication devices 138-1, . . . 138-M are circuit-switched. Each of the communication devices 138-1, . . . 138-M corresponds to one of a set of internal extensions Ext1, . . . ExtM, respectively. These extensions are referred to herein as "internal" in that they are extensions within the premises that are directly serviced by the switch. More particularly, these extensions correspond to conventional communication device endpoints serviced by the switch/server, and the switch/server can direct incoming calls to and receive outgoing calls from these extensions in a conventional manner. The second communication devices can include, for example, wired and wireless telephones, PDAs, H.320 videophones and conferencing units, fax machines, analog and DCP digital phones, voice messaging and response units, traditional computer telephony adjuncts, and any other communication device.

It should be noted that the invention does not require any particular type of information transport medium between switch or server and first and second communication devices, i.e., the invention may be implemented with any desired type of transport medium as well as combinations of different types of transport channels.

The packet-switched network 162 can be any data and/or distributed processing network, such as the Internet. The network 162 typically includes proxies (not shown), registrars (not shown), and routers (not shown) for managing packet flows.

The packet-switched network 162 is in communication with an external first communication device 174 via a gateway 178, and the circuit-switched network 154 with an external second communication device 180. These communication devices are referred to as "external" in that they are not directly supported as communication device endpoints by the switch or server. The communication devices 174 and 180 are an example of devices more generally referred to herein as "external endpoints."

In one configuration, the server 110, network 162, and first communication devices 134 are Session Initiation Protocol or SIP compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk.

It should be emphasized that the configuration of the switch, server, user communication devices, and other elements as shown in FIG. 1 is for purposes of illustration only and should not be construed as limiting the invention to any particular arrangement of elements.

As will be appreciated, the central server 110 is notified via LAN 142 of an incoming contact by the communications component (e.g., switch 130, fax server, email server, web server, and/or other server) receiving the incoming contact. The incoming contact is held by the receiving communications component until the server 110 forwards instructions to the component to forward or route the contact to a specific contact center resource, such as the IVR unit 122, the voice mail server 118, and/or first or second communication device 134, 138 associated with a selected agent, which may include an agent remotely connected to the LAN via a WAN-type connection. The server 110 distributes and connects these contacts to communication devices of available agents based on the predetermined criteria noted above. When the central server 110 forwards a voice contact to an agent, the central server 110 also forwards customer-related information from databases 114 to the agent's computer work station for previewing and/or viewing (such as by a pop-up display) to permit the agent to better serve the customer. The agents process the contacts sent to them by the central server 110.

According to at least one embodiment of the present invention, an evolutionary router 232 is provided. The evolutionary router 232 is stored either in the main memory or in a peripheral memory (e.g., disk, CD ROM, etc.) or some other computer-readable medium of the center 100. In accordance with at least one embodiment of the present invention, the evolutionary router 232 is operable to support and enhance the skill-based routing decisions made by the agent and contact selector 220. In such an embodiment, the evolutionary router 232 may receive feedback from serviced contacts to determine the efficacy of an agent or agents. Based on this feedback, the evolutionary router 232 may be adapted to dynamically update the agent skill queues 212a-N by assigning agents new skills or revoking certain skills from agents.

In accordance with at least one embodiment of the present invention, the evolutionary router 232 may treat each of the agent skill queues 212a-N as separate "species" where each agent in that queue is a member of the species. In such an embodiment, the "skills" of the agents in the queue 212 may be characterized as either Hero, non-Hero, or Anomaly. These classifications may be made based on each agent's performance as compared to a set of predefined performance criteria (which may also be based on the performance of a particular Hero agent). This is a significant departure from traditional skill-based routing where each agent is given a skill level for certain contact types or subject matter and where that skill level is assigned to the agent by his/her supervisor. Thus, the evolutionary router 232 provides a mechanism to augment and enhance traditional skill-based routing or replace traditional skill-based routing with evolutionary routing algorithms. In either use the evolutionary router 232 may be operable to create "Natural Disasters" that are aimed at testing agents in the queues (e.g., agents that are a part of a particular Species) and determining an evolutionary factor for each agent and the species as a whole.

Although the server 110 is depicted as having the evolutionary router 232 work in connection with traditional skill-based agent queues 212a-N, one skilled in the art will appreciate that the server 110 may comprise agent groups that are referred to as Species in addition or in lieu of the skill-based agent queues 212a-N, where each Species is provided to serve a particular business function. While applying a pure evolutionary routing algorithm, the evolutionary router 232 may route contacts to each Species based on the determined difficulty of the received contact as well as other evolutionary routing parameters that will be discussed in further detail below. Alternatively, while applying a hybrid skill-based/evolutionary routing algorithm, the evolutionary router 232 may augment the agent skills with determined evolutionary factors for the agents and the collection of agents.

Figure 3:
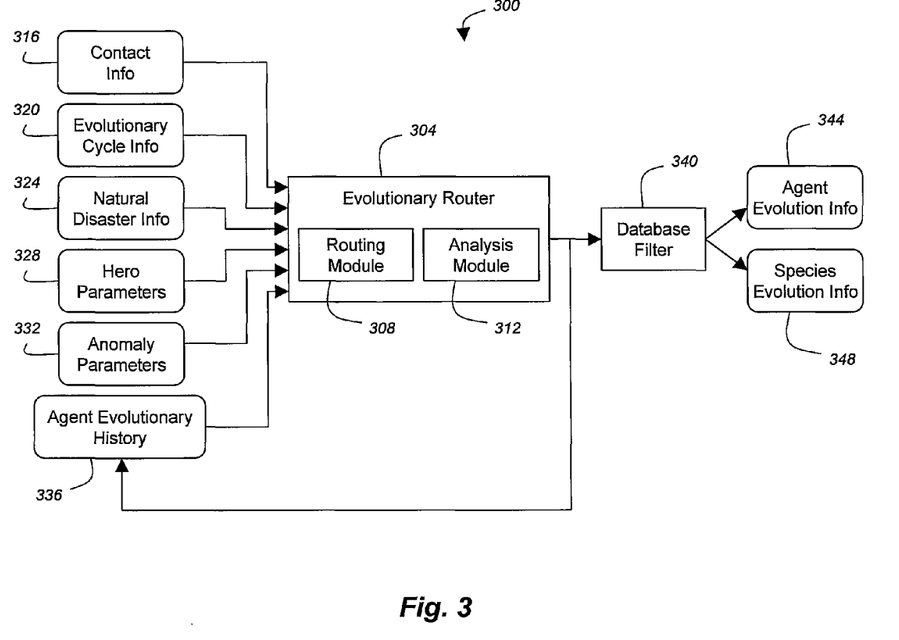
FIG. 3 is a block diagram depicting the logical inputs and outputs of an evolutionary router in accordance with at least some embodiments of the present invention.

Referring now to FIG. 3, additional details of the evolutionary routing system 300 will be discussed in accordance with at least some embodiments of the present invention. The evolutionary routing system 300 may comprise an evolutionary router 304 (similar to the evolutionary router 232 depicted in FIG. 2) that includes a plurality of logical and/or actual inputs and outputs that are designed to assist in pure skill-based routing, pure evolutionary routing, and/or hybrid skill-based/evolutionary routing decisions. Examples of such inputs include, but are not limited to, contact information 316, evolutionary cycle information 320, natural disaster information 324, Hero parameters 328, anomaly parameters 332, and agent evolutionary history 336. Outputs of the evolutionary router 304 may include, but are not limited to, agent evolution information 344, species evolution information 348, and evolutionary factors. The evolutionary factors may be provided as a system feedback in the form of agent evolutionary history 336 whereas the agent evolution information 344 and species evolution information 348 may pass through a database filter 340 that removes certain information that is deemed not necessary for long-term storage. Any data that passes through the database filter 340 may be stored in the database 114 for future reference or for creation of various reports outlining agent performance.

In accordance with at least some embodiments of the present invention, the evolutionary router 304 may comprise a routing module 308 for making evolutionary routing decisions. The evolutionary router 304 may further include an analysis module 312 for analyzing the contact handling performance of agents. Based on how well an agent handles a particular contact or a natural disaster contact, the analysis module 312 may determine an evolutionary factor for that agent. The evolutionary factor for each agent or a collection of agents (e.g., a Species) may be based on a set of predetermined performance criteria and/or a comparison of how well the agent serviced a contact versus how well a Hero and/or Anomaly agent handled a contact having a similar difficulty and/or content. The analysis module 312 may also provide the evolutionary router 304 with the ability to dynamically and automatically update skills that are assigned to certain agents in a skill-based or hybrid routing scheme.

The evolutionary routing decisions made by the routing module 308 may be based on evolutionary factors determined by the analysis module 312. The routing module 308 may alternatively assist skill-based routing based on such evolutionary factors.

The evolutionary router 232, 304 is an additional layer of logic, targeting the enhancement of the traditional skill-based routing approach. The skill settings are usually defined during the deployment of the system and require lots of maintenance from the supervisors in order to be kept up to date.

The evolutionary router 232, 304 starts from the initially configure set of skills and respective skill levels. However, it adds the evolutionary factor which indicates how effective that agent is when compared against the role models of the company.

Figure 4:
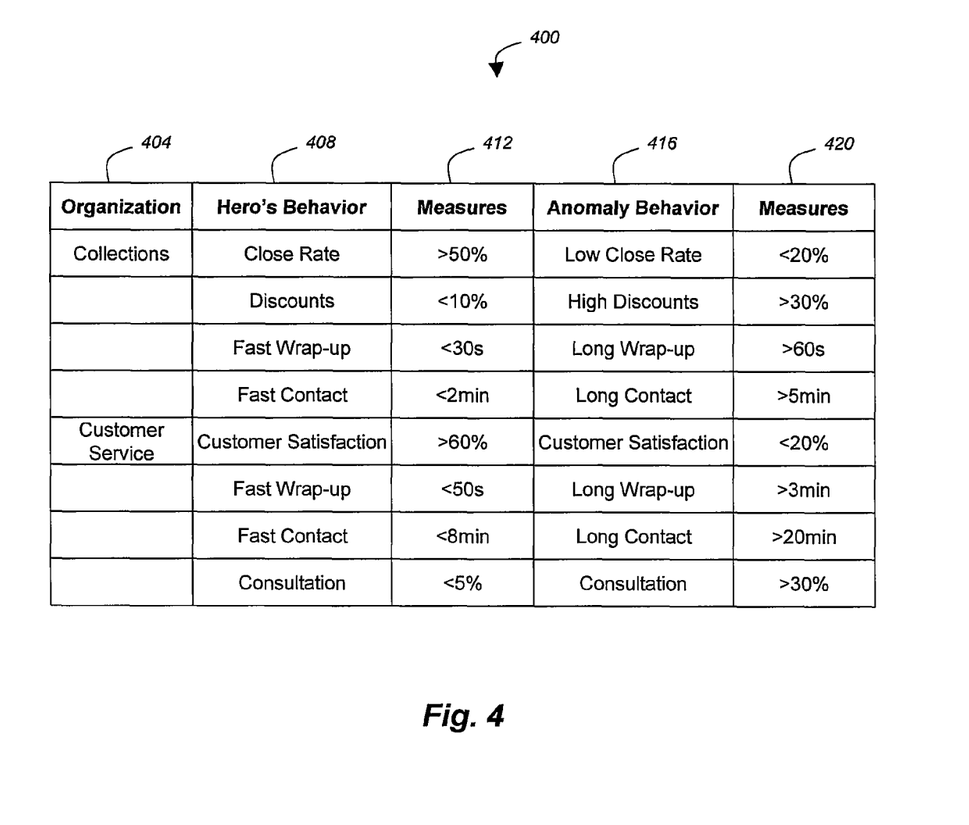
FIG. 4 is a block diagram depicting a first data structure used in accordance with at least some embodiments of the present invention.

During initial setup, system administrators may define what the role models for Heroes and Anomalies are. They would have tools to set rules like the ones shown in FIG. 4, for example. Referring now to FIG. 4, an exemplary data structure 400 will be described in accordance with at least some embodiments of the present invention. The data structure 400 may include a number of different data fields for storing and monitoring certain characteristics that define Hero and Anomaly behavior. As can be appreciated, the Hero/Anomaly characteristics vary from Species to Species depending upon the business unit and function of each Species. Accordingly, contact center agents in customer service, for example, may have a different set of Hero/Anomaly characteristics than agents in collections. Examples of the data fields that may be included in the data structure 400 include, but are not limited to, an organization field 404, a Hero's behavior field 408, a Hero metrics or measures field 412, an Anomaly's behavior field 416, and an Anomaly metrics or measures field 420. The values in the metrics or measures fields 412, 420 may be based upon the actual performance of identified Heroes/Anomalies in the contact center. Alternatively, the values in the metrics or measures fields 412, 420 may be predetermined criteria that are defined by a contact center supervisor or administrator.

In order to keep the contact center safe and stable, a few external parameters may be included in or imposed on the system 100. There may be a need to set how long the Evolutionary Cycles are going to be and how hard its Natural Disasters are going to hit the Species. Another important piece of information is a classification of the Customers. Agents will have to use their own perceptions in order to provide hints about the customer's personality. Those are external factors used to prevent the traditional contact center metrics from getting negatively affected by experimentations conducted during the Evolutionary Cycles.

Figure 5:
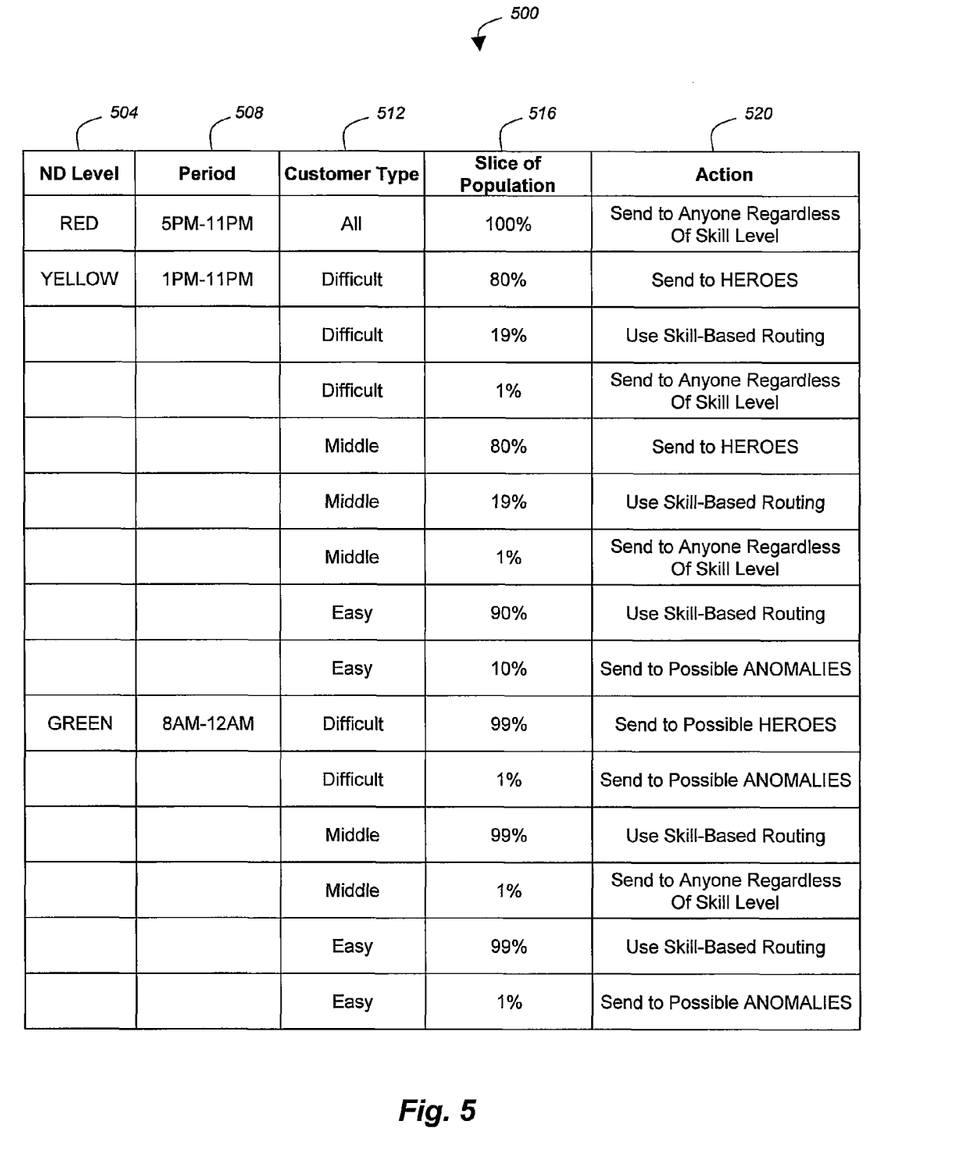
FIG. 5 is a block diagram depicting a second data structure used in accordance with at least some embodiments of the present invention.

With reference now to FIG. 5, a second data structure 500 will be described in accordance with at least some embodiments of the present invention. The data structure 500 may be used to store business rules (e.g., evolutionary routing criteria) to be applied during Evolutionary Cycles or any other time that evolutionary routing is desired either alone or in combination with skill-based routing. The data structure 500 may include a plurality of different fields for information that may be used during evolutionary routing. Examples of such fields include, without limitation, a Natural Disaster level field 504, a period or time-frame field 508, a customer type field 512, a population percentage field 516, and an action field 520.

The Natural Disaster level field 504 describes the magnitude of Natural Disaster that is allowable during the corresponding time period defined in the period field 508. During such a time period, Natural Disasters of the identified magnitude may and likely will be inflicted on the system. Practically speaking, it may be desirable to limit or completely restrict the occurrence of Natural Disasters during peak hours (e.g., between 8 AM and 12 PM). Accordingly, such a time period may be restricted to a Natural Disaster level of GREEN, which means that only slight Natural Disasters should be imposed and therefore most difficult contacts should go to possible Heroes whereas most easy contacts can be sent to either Anomalies or routed according to skill-based routing if a hybrid routing approach is desired.

Alternatively, there may be certain time periods, such as non-peak time periods, that are most suitable for imposing Natural Disasters of greater magnitude. During these time periods, contacts may be delivered ad hoc to any agent without any regard for the difficulty of the contact. Thus, it is equally likely that a Hero and Anomaly will receive a difficult contact. These types of large Natural Disasters are meant to help the Species evolve and can further expedite the identification of Heroes and Anomalies.

All contacts are monitored and recorded in special reporting cabinets for each Evolutionary Cycle. It is anticipated that for real customer environments, filters could be added to the system in order to prevent the overflow of the database 114.

After each contact, the evolutionary router 232, 304 will make calculations based on the contact trace information and check how close to the role models the specific agent is. That Evolutionary State sample will be stored into the agent profile and at the end of each Evolutionary Cycle, an average will be calculated and assigned to the agent as its new evolutionary state.

This Evolutionary state means to the Evolutionary Routing Mechanism how close this agent is from becoming a Hero or an Anomaly. In other words, it means how effective that agent is to the business according to the predefined standards.

The evolutionary router 232, 304 might be adapted to operate in two modes, Assistant and Automatic. In the Assistant mode, the evolutionary router 232, 304 might allow the system to suggest and implement changes in the agent skill levels based on the fluctuation of the agent's evolutionary state. This mode would work as a Supervisor assistant and it would be enabled only in arbitrary periods of time for evaluation of the CC agents. Supervisors would collect the feedback and use the information according to their needs. CC would use pure skill-based routing at the most of the time.

In the Automatic mode, supervisors could configure the evolutionary routing rules and all contact routing would be executed based on such rules. As shown in FIG. 5, skill-based routing could be used as part of the routing mechanism. The main difference in this case is that the system would have a better distinction between agents with similar skill levels. Instead of trusting only on the pre-configured skill levels, the system is capable to indexing the agents based on their past effectiveness. For instance, telling the system to assign a call to an available Hero would mean that system needs to find the most effective agent with the required skills in order to connect the call.

The evolutionary router 232, 304 takes advantage of statistical data and real-time experimentation in order to provide better routing rules. Its objective could be as simple as providing factual information so that supervisors can review their team skills; and it can also be as complex as providing a complete different routing mechanism where agents are classified by their effectiveness instead of the skill levels. It is important to highlight that agents with similar skill levels have behavior particularities that make them more or less effective than others. Identifying these particularities and using then in advantage of the contact center performance is what is brought to life by this new algorithm.

Figure 6:
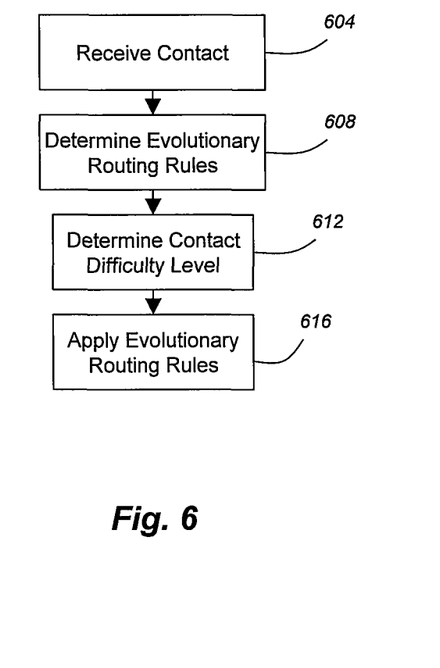
FIG. 6 is a flow diagram depicting an evolutionary routing method in accordance with at least some embodiments of the present invention.

Referring now to FIG. 6, an evolutionary routing method will be described in accordance with at least some embodiments of the present invention. The method begins when a contact is received in the contact center (step 604). After the contact has been received, the evolutionary routing rules that are to be applied to the received contact are determined (step 608). This determination may be made by the evolutionary router 232, 304 and/or the skill-based routing agent 220 and may further be defined by a system administrator of supervisor.

The method continues by determining the difficulty associated with the contact (step 612). The difficulty of a contact may be determined based on customer contact history, the subject-matter of the contact, and/or analyzing other known contact parameters that provide an indication of contact difficulty. The evolutionary router 232, 304 and/or the skill-based routing agent 220 may be adapted to make this determination. An IVR may also be used to obtain information about the subject-matter of the contact to further assist the system in determining the difficulty of the contact. The customer initiating the contact may also be asked to provide an indication of his/her perceived difficulty of the contact.

Once the difficulty of the contact has been determined, the method continues by applying the evolutionary routing rules to the contact (step 616). The evolutionary routing rules may take into consideration the difficulty of the contact as well as the time of day and the permissible level of Natural Disasters. Alternatively, the routing rules may be purely skill-based or a hybrid skill-based/evolutionary routing rules. In accordance with at least some embodiments of the present invention, the evolutionary router 232, 304 may make the determination as to the routing rules and thus restrict or limit its own activity in the routing process as well as restrict or limit the level of interaction that the skill-based routing agent 220 has with the contact.

Figure 7:
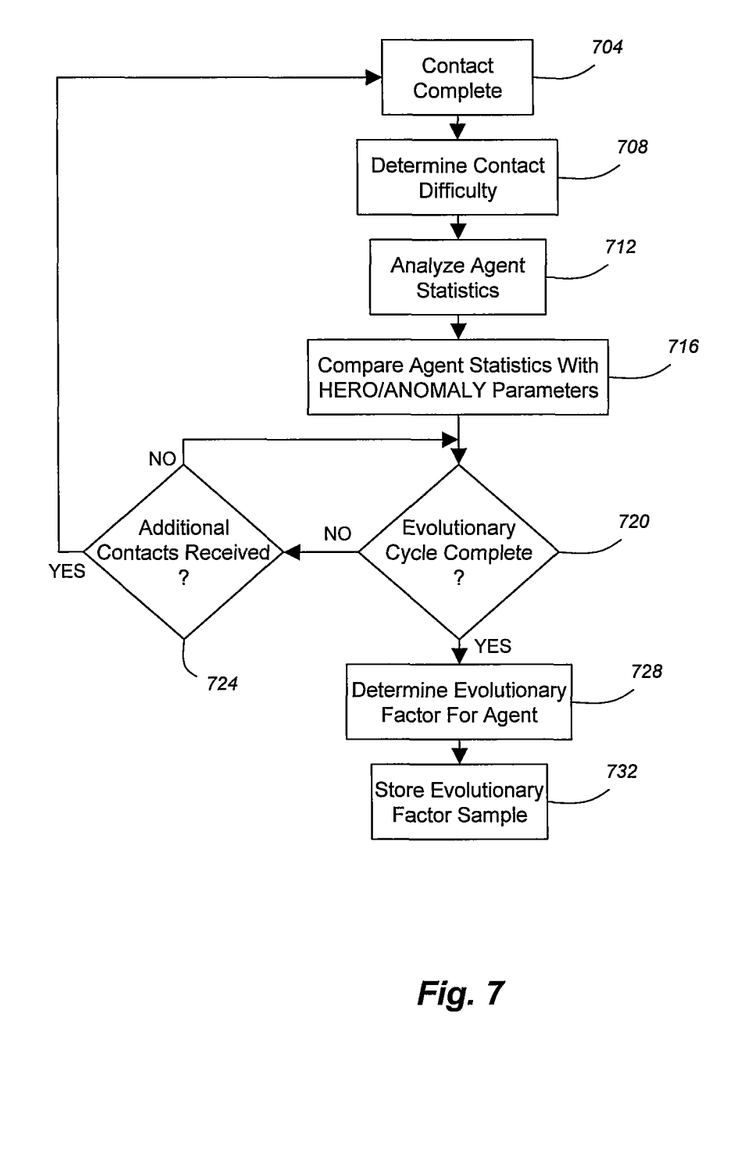
FIG. 7 is a flow diagram depicting a method of determining evolutionary factors in accordance with at least some embodiments of the present invention.

Referring now to FIG. 7, a method of determining evolutionary factors for an agent or collection of agents will be discussed in accordance with at least some embodiments of the present invention. Although the following method will generally be described in connection with a single contact center agent, one skilled in the art will appreciate that substantially the same steps may be taken to determine the evolutionary factor(s) associated with a collection of agents.

The method begins after a contact has been serviced (step 704). This may be after a contact has been either partially or completely serviced. Following completion of the contact servicing step, the method continues with the evolutionary router 232, 304 determining the difficulty associated with the contact (step 708). Of course, other contact center elements may be capable of determining the difficulty associated with the contact.

With the difficulty of the contact determined, the method continues by analyzing the agent statistics associated with the completed contact (step 712). More specifically, the evolutionary router 232, 304 may utilize the analysis module 312 to determine performance metrics for the recently serviced contact. Examples of the types of performance metrics that may be determined by the analysis module 312 may vary depending upon the nature of the contact. More specifically, for a collections-type contact, the analysis module 312 may determine whether the agent closed or collected from the contact, whether a discount was given by the agent, the amount of time that it took to wrap-up the contact, and the amount of time that the contact took to service from beginning to end. On the other hand, if the contact was related to a customer-service type contact, then the analysis module 312 may determine the level of customer satisfaction associated with the serviced contact, whether a consultation was needed by the agent, and other factors in addition to the factors that are determined for a collections-type contact.

Once the agent statistics associated with servicing the contact have been determined, the analysis module 312 continues by comparing the agent statistics with the Hero/Anomaly parameters (step 716). The Hero/Anomaly parameters that are compared to the actual agent statistics may be retrieved from the data structure 400 or may retrieved from real-time actual statistics for identified Heroes and/or Anomalies that have serviced a similar contact within the same Evolutionary Cycle. The method continues by determining whether the Evolutionary Cycle has completed (step 720). This determination may be made by referencing a timer associated with the Evolutionary Cycle and/or whether any Natural Disasters are currently being applied to the contact center.

In the event that the Evolutionary Cycle is not complete, then the method continues by determining whether any additional contacts have been received (step 724). If no additional contacts have been received, then the method returns to step 720. On the other hand, if a new contact has been received within the same Evolutionary Cycle, then the method returns to step 704.

If, however, the Evolutionary Cycle has completed, then the analysis module 312 will continue by determining the evolutionary factor for the agent and/or the collection of agents that just underwent the Natural Disaster(s) during the Evolutionary Cycle (step 728). The evolutionary factor may be calculated by comparing how well the agent did compared to actual Heroes and/or Anomalies during that Evolutionary cycle and/or how well the agent did compared to Hero/Anomaly parameters. Additionally, the analysis module 312 may also consider whether the agent has progressed toward Hero status or regressed toward Anomaly status since the last Evolutionary Cycle in determining the agent's evolutionary factor. The evolutionary factor may then be stored in the agent's evolutionary history to track the progression of the agent's skills (step 732). In accordance with at least one embodiment of the present invention, all of the statistics recovered during the Evolutionary Cycle for the agent may also be stored in the database 114. Alternatively, all of the collected statistics may be passed through a database filter 340 before they are stored as the agent's evolutionary information.

Figure 8:
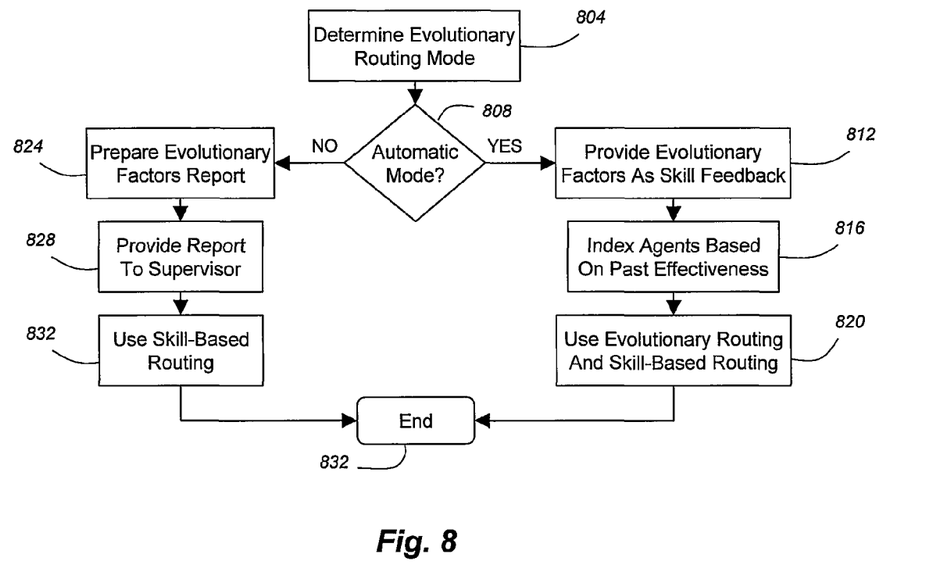
FIG. 8 is a flow diagram depicting an alternative evolutionary routing method in accordance with at least some embodiments of the present invention.

With reference now to FIG. 8, an alternative routing method will be described in accordance with at least some embodiments of the present invention. The method begins with the evolutionary router 232, 304 determining which type of evolutionary routing mode will be employed (step 804). Where the two choices include an automated or assisted evolutionary routing mode. If it is determined that an automated evolutionary routing mode is to be employed (step 808), then the method continues with the evolutionary router 232, 304 providing evolutionary factors as feedback to the skill-based routing agent 220 (step 812). More specifically, the evolutionary router 232, 304 may determine evolutionary factors and from those factors determine whether an agent is currently assigned the appropriate skill levels.

The method continues with the evolutionary router 232, 304 indexing the agents based on their past effectiveness (step 816). In other words, the evolutionary router 232, 304 may upgrade an agent's skill level or assign the agent a new skill if it is determined that the skill level currently assigned to that agent is too low or non-existent (based on the agent's evolutionary factor). Alternatively, the evolutionary router 232, 304 may downgrade an agent's skill level or revoke a particular skill if it is determined that the skill level currently assigned to that agent is too high (based on the agent's evolutionary factor). In this way, the evolutionary router 232, 304 may be adapted to provide an automated feedback to the skill-based routing agent 220 if a hybrid routing approach is being employed. If, however, a pure evolutionary routing scheme is being employed, then the need for feedback to the skill-based routing agent 220 may not be necessary since only Evolutionary Routing decisions are made (which are not skill-based). Also in this step, the evolutionary router 232, 304 may assign Hero/Anomaly titles to the appropriate agents if a new Hero/Anomaly was identified. Similarly, the evolutionary router 232, 304 may revoke Hero/Anomaly titles from certain agents if necessary.

After the agents have been appropriately indexed and the skill-levels of those agents have been updated, the method continues with the routing module 308 applying the evolutionary routing scheme to newly received contacts either in a pure evolutionary routing scheme or in a hybrid routing scheme (step 820). Thereafter the method ends (step 832). Of course, the method may also start again at step 804.

Referring back to step 808, if it is determined that an assisted mode is to be employed, then the evolutionary router 232, 304 will utilize the analysis module 312 to prepare an evolutionary factors report (step 824). The evolutionary factors report may report on the evolutionary progress of a single agent or collection of agents. Additionally, the evolutionary factors report may provide information regarding whether a particular agent or collection of agents have attained or lost the status of Hero/Anomaly.

After the report has been prepared by the evolutionary router 232, 304, the report is provided to the appropriate supervisor (step 828). The supervisor may use the report to determine if training or other corrective measures should be taken to address a decrease in an agent's evolutionary factor. Additionally, the report can be used to identify agents that should receive praise or recognition based on their performance. The supervisor may also make the determination as to whether any agent skills should be altered, added, or revoked. Thereafter, the method continues by utilizing the pure skill-based routing scheme (step 832). The method then ends in step 832 or may go-back to step 804.

While the above-described flowcharts have been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a server, personal computer, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using procedural or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the communication arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for efficiently routing contacts in a contact center architecture. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A communication method, comprising:
  receiving a contact at a contact center;
  applying an evolutionary routing algorithm to assign a first resource in the contact center to the contact;
  determining that the contact center is in an Evolutionary Cycle;
  identifying a set of one or more Natural Disasters and a set of identified magnitudes singly corresponding to each of the one or more Natural Disasters in the set, wherein the identified magnitudes are based on the evolutionary speed of the contact center; and
  applying at least one of the Natural Disasters in the set, to the contact center, wherein applying the at least one of the Natural Disasters in the set comprises assigning the contact to the first resource when the contact comprises an evolutionary status requirement that does not equal the evolutionary status of the first resource, wherein the at least one of the Natural Disasters in the set is imposed on the contact center according to the identified magnitude of the at least one of the Natural Disasters in the set to determine a set of evolutionary information about the first resource,
  wherein the Evolutionary Cycle is a pre-determined amount of time based on the identified magnitude of the at least one of the Natural Disasters in the set, and
  wherein a performance of the first resource is analyzed using the set of evolutionary information to obtain an analyzed performance.

2. The method of claim 1, wherein applying the evolutionary routing algorithm comprises:
  determining an evolutionary status for at least some resources in the contact center;
  determining an evolutionary status requirement for the contact; and
  matching the evolutionary status requirement for the contact with the first resource.

3. The method of claim 2, further comprising:
  determining that the contact center is not in the Evolutionary Cycle; and
  wherein the contact comprises an evolutionary status requirement that equals the evolutionary status of the first resource to which it is assigned.

4. The method of claim 1, wherein the first resource comprises an evolutionary status other than a Hero status and wherein the contact comprises an evolutionary status requirement of Hero.

5. The method of claim 1, wherein applying an evolutionary routing algorithm comprises augmenting skill-based routing with the evolutionary routing algorithm.

6. The method of claim 1, further comprising:
  analyzing an agent's performance during the Evolutionary Cycle;
  comparing the agent's performance to performance metrics associated with at least one of a Hero and Anomaly agent; and
  based on the comparing step, determining an evolutionary factor for the agent.

7. The method of claim 6, further comprising:
  determining an evolutionary history for the agent by comparing the evolutionary factor determined during the Evolutionary Cycle with a previously determined evolutionary factor for the agent.

8. The method of claim 6, further comprising:
  using the evolutionary factor for the agent to update a skill level for the agent, wherein the skill level is used for skill-based routing decisions.

9. A non-transitory computer readable medium encoded with processor executable instructions for performing the method of claim 1.

10. The method of claim 1, wherein an evolution of the first resource is documented in a report comprising an initial performance of the resource and the performance, wherein the initial performance occurred prior to obtaining the analyzed performance.

11. The method of claim 1, wherein the evolutionary router is further operable to receive a contact at a contact center wherein the contact center routes the contact according to at least one of a skills-based routing scheme, an evolutionary routing scheme, and a hybrid routing scheme, wherein the hybrid routing scheme is a combination of the skills-based routing scheme and the evolutionary routing scheme, and the evolutionary router is further operable to apply an evolutionary routing algorithm to the contact received at the server such that the contact is assigned to the first resource in a contact center.

12. The method of claim 11, wherein the evolutionary routing algorithm is a component of the evolutionary routing scheme.

13. A communication device, comprising:
an evolutionary router operable to receive a contact and apply an evolutionary routing module to assign the contact to a first resource in a contact center, wherein the evolutionary router is further operable to determine that the contact center is in an Evolutionary Cycle, identify a set of one or more Natural Disasters and a set of identified magnitudes singly corresponding to each of the one or more Natural Disasters in the set, wherein the identified magnitudes are based on the evolutionary speed of the contact center, and apply at least one of the Natural Disasters in the set to the contact center, wherein when the evolutionary router applies the at least one of the Natural Disasters in the set the evolutionary router assigns the contact to the first resource when the contact comprises an evolutionary status requirement that does not equal the evolutionary status of the first resource, wherein the at least one of the Natural Disasters in the set is imposed on the contact center according to an identified magnitude of the at least one of the Natural Disasters in the set to determine a set of evolutionary information about the first resource, wherein the Evolutionary Cycle is a pre-determined amount of time based on the identified magnitude of the at least one of the Natural Disasters in the set, and wherein a performance of the first resource is analyzed using the set of evolutionary information to obtain an analyzed performance.

14. The device of claim 13, wherein the evolutionary router is further operable to determine an evolutionary status for at least some resources in the contact center, determine an evolutionary status requirement for the contact, and match the evolutionary status requirement for the contact with the first resource.

15. The device of claim 14, wherein the evolutionary router is further operable to determine that the contact center is not in the Evolutionary Cycle and wherein the contact comprises an evolutionary status requirement that equals the evolutionary status of the first resource to which it is assigned.

16. The device of claim 13, wherein the first resource comprises an evolutionary status other than a Hero status and wherein the contact comprises an evolutionary status requirement of Hero.

17. The device of claim 13, wherein the evolutionary router is further operable to augment a skill-based routing algorithm.

18. The device of claim 13, wherein the evolutionary router is further operable to analyze an agent's performance during the Evolutionary Cycle, compare the agent's performance to performance metrics associated with at least one of a Hero and Anomaly agent, then, based on the comparing step, determine an evolutionary factor for the agent.

19. The device of claim 18, wherein the evolutionary router is further operable to perform at least one of the following operations:

(i) determine an evolutionary history for the agent by comparing the evolutionary factor determined during the Evolutionary Cycle with a previously determined evolutionary factor for the agent; and
(ii) use the evolutionary factor for the agent to update a skill level for the agent, wherein the skill level is used for skill-based routing decisions.

20. A communication system, comprising:
a server comprising an evolutionary router operable to apply an evolutionary routing algorithm to contacts received at the server such that the received contacts are assigned to an appropriate resource in a contact center, wherein the evolutionary router is further operable to determine that the contact center is in an Evolutionary Cycle, identify a set of one or more Natural Disasters and a set of identified magnitudes singly corresponding to each of the one or more Natural Disasters in the set, wherein the identified magnitudes are based on the evolutionary speed of the contact center, and apply at least one of the Natural Disasters in the set to the contact center, wherein when the evolutionary router applies the at least one of the Natural Disasters in the set it assigns the contact to the first resource when the contact comprises an evolutionary status requirement that does not equal the evolutionary status of the first resource, wherein the at least one of the Natural Disasters in the set is imposed on the contact center according to an identified magnitude of the at least one of the Natural Disasters in the set to determine a set of evolutionary information about the first resource, wherein the Evolutionary Cycle is a pre-determined amount of time based on the identified magnitude of the at least one of the Natural Disasters in the set, and wherein a performance of the first resource is analyzed using the set of evolutionary information to obtain an analyzed performance.

21. The system of claim 20, wherein the evolutionary router is further operable to determine an evolutionary status for at least some resources in the contact center, determine an evolutionary status requirement for a contact, and match the evolutionary status requirement for the contact with a first resource.

22. The system of claim 20, wherein the evolutionary router is further operable to augment a skill-based routing algorithm.

23. The system of claim 20, wherein the evolutionary router is further operable to analyze an agent's performance during an Evolutionary Cycle, compare the agent's performance to performance metrics associated with at least one of a Hero and Anomaly agent, then, based on the comparing step, determine an evolutionary factor for the agent.

24. The system of claim 23, wherein the evolutionary router is further operable to perform at least one of the following operations:

(i) determine an evolutionary history for the agent by comparing the evolutionary factor determined during the Evolutionary Cycle with a previously determined evolutionary factor for the agent; and
(ii) use the evolutionary factor for the agent to update a skill level for the agent, wherein the skill level is used for skill-based routing decisions.

\* \* \* \* \*